(12) United States Patent
Yoshioka et al.

(10) Patent No.: US 7,167,520 B2
(45) Date of Patent: Jan. 23, 2007

(54) TRANSCODER

(75) Inventors: Kosuke Yoshioka, Daito (JP); Makoto Hirai, Suita (JP); Tetsuji Mochida, Katano (JP); Hiroyuki Oka, Kashiwara (JP); Hideshi Nishida, Nishinoya (JP); Tokuzo Kiyohara, Osaka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 672 days.

(21) Appl. No.: 10/686,237

(22) Filed: Oct. 15, 2003

(65) Prior Publication Data

US 2005/0238095 A1   Oct. 27, 2005

(30) Foreign Application Priority Data

Oct. 15, 2002   (JP)   ............................. 2002-300106

(51) Int. Cl.
*H04B 1/66* (2006.01)

(52) U.S. Cl. .................. 375/240.21; 375/240.25; 375/240.24; 375/240.26; 382/298; 382/299; 382/235; 382/233; 382/277; 358/451; 358/453

(58) Field of Classification Search .......... 375/240.21, 375/240.25, 240.24, 240.26; 382/298, 299, 382/235, 233, 277; 358/451, 453
See application file for complete search history.

(56) References Cited

U.S. PATENT DOCUMENTS 5,128,776 A * 7/1992 Scorse et al. ............... 382/240
6,456,661 B1 * 9/2002 Morel .................... 375/240.16

FOREIGN PATENT DOCUMENTS

JP         2001-285875         12/2001

* cited by examiner

*Primary Examiner*—Shawn S. An

(57) ABSTRACT

A transcoder for resizing video data and outputting the resized video data to a reproduction apparatus. The reproduction apparatus reproduces the resized video data by repeating a display period and a non-display period alternately. The transcoder includes: a resizing unit that resizes the video data; and a control unit that causes the resizing unit to resize the video data to first video data having a first resolution so that the reproduction apparatus displays one image during each display period, and causes the resizing unit to resize, during each period between the resizing of the video data to the first video data, the video data to second video data having a second resolution that is lower than the first resolution.

9 Claims, 4 Drawing Sheets

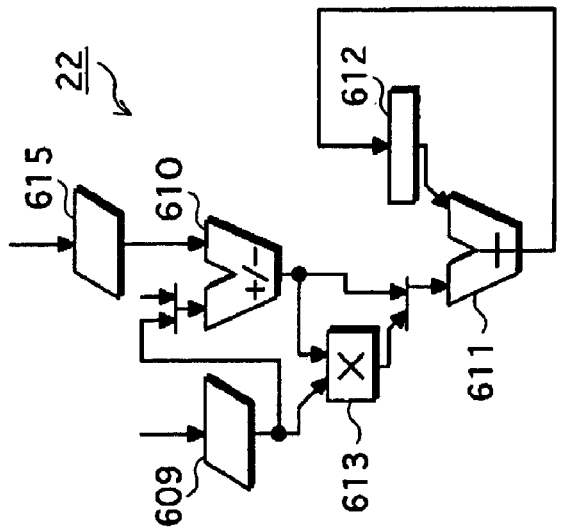
FIG.4C RESIZING/ME SHARED CIRCUIT
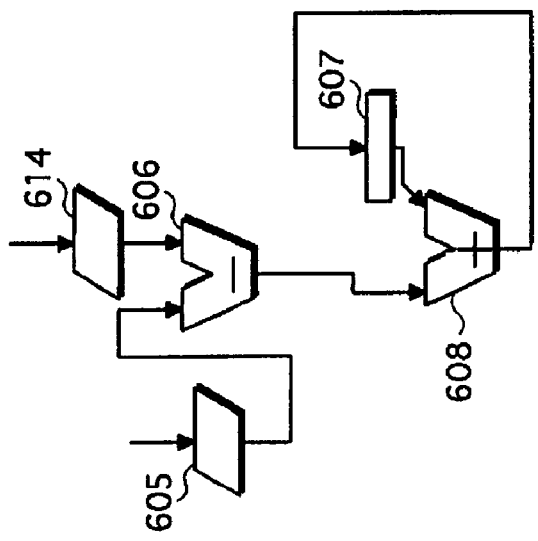
FIG.4B MOTION PREDICTION CIRCUIT
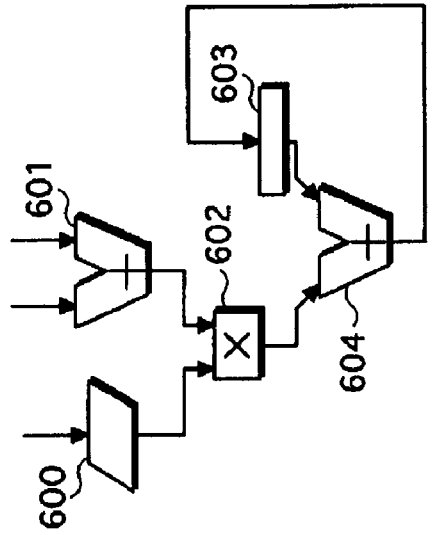
FIG.4A RESIZING CIRCUIT

US 7,167,520 B2

TRANSCODER

BACKGROUND OF THE INVENTION (1) Field of the Invention

The present invention relates to a technology of transcoding video data received in digital broadcasting or the like to a different coding format.

(2) Description of the Related Art

In recent years, technologies for allowing people to view digital broadcast programs on mobile terminals as well as on television receivers have been proposed. For example, Japanese Laid-Open Patent Application No. 2001-285875 discloses a technology of transcoding an MPEG2 stream having been broadcast for television receivers to a low-resolution stream such as an MPEG4 stream.

When the necessity to reduce the ratio of occupying the apparatus discs and the necessity to reduce a time required to generate an MPEG4 stream from a received MPEG2 stream are taken into consideration, the transcoder is expected to have a construction shown in FIG. 1 in which the transcoder performs a streaming reproduction for television receivers in parallel with the transcoding from MPEG2 to MPEG4.

As shown in FIG. 1, after the transcoder receives an MPEG2 stream, a decompressing unit 80 decompresses compressed video data contained in the received MPEG2 stream, and outputs the decompressed video data to a first resizing unit 50 and a second resizing unit 60. The first resizing unit 50 converts the received video data to, for example, a resolution of 1,920 pixels×1,080 lines and 30 frames/second for HDTV (High-Definition TeleVision) receivers, and outputs the converted video data to television receivers or the like. In parallel with the operation of the first resizing unit 50, the second resizing unit 60 converts the received video data to, for example, a resolution of 360 pixels×240 lines and 10 frames/second for mobile terminals, and outputs the converted video data to a re-compressing unit 70. The re-compressing unit 70 compresses the received video data in compliance with the MPEG4 standard, and outputs an MPEG4 stream of the compressed video data. The MPEG4 stream is transferred to mobile terminals via the Internet or recording mediums.

SUMMARY OF THE INVENTION

The object of the present invention is therefore to provide a transcoder with a smaller hardware size than the conventional apparatus shown in FIG. 1, achieving a reduced apparatus size and a cost reduction.

The above object is fulfilled by a transcoder for resizing video data and outputting the resized video data to a reproduction apparatus, the reproduction apparatus reproducing the resized video data by repeating a display period and a non-display period alternately, the transcoder comprising: a resizing unit operable to resize the video data; and a control unit operable to cause the resizing unit to resize the video data to first video data having a first resolution so that the reproduction apparatus displays one image during each display period, and cause the resizing unit to resize, during each period between the resizing of the video data to the first video data, the video data to second video data having a second resolution that is lower than the first resolution.

With the above-described construction, the resizing unit performs the resizing of the video data to the first video data by timing the resizing to the display periods of the reproduction apparatus. This generates idle times between the resizing processes. The resizing unit resizes the video data to the second video data using the idle times. With such an arrangement, the transcoder of the present invention performs the two types of resizing processes in parallel, without having two resizing units, which is the case of conventional technologies.

The above transcoder may further comprise: a receiving unit operable to receive-encoded video data from outside the transcoder; a decoding unit operable to decode the received encoded video data to obtain the video data to be resized by the resizing unit to the first video data; and an encoding unit operable to encode video data, wherein the control unit causes the encoding unit to encode the second video data.

With the above-described construction, the second video data having he second resolution is encoded by the encoding unit and then transferred to mobile terminals or the like via the Internet or recording mediums.

In the above transcoder, the encoding unit may cause the decoding unit to perform, during each period between the decoding by the decoding unit for the video data to be resized to the first video data, a local decoding on second encoded video data that is obtained by encoding the video data obtained by the decoding unit, and the encoding unit performs a predetermined calculation using a result of the local decoding to obtain a prediction error, during each period between the resizing of the video data to the first video data, and encodes video data based on the calculated prediction error.

With the above-described construction, the encoding unit causes the decoding unit to perform, during each idle time of the decoding unit, that is, each period between the resizing of the video data to the first video data, decoding for the prediction encoding. This simplifies the circuit structure of the encoding unit.

In the above transcoder, the encoded video data received by the receiving unit has been subject to a DCT process and a quantization process, and the decoding unit includes: an inverse quantization sub-unit operable to perform an inverse quantization process corresponding to the quantization process, on the received video data; and an inverse DCT sub-unit operable to perform an inverse DCT process corresponding to the DCT process, on the received video data, wherein the decoding performed by the decoding unit caused either by the control unit or the encoding unit includes the inverse quantization process and the inverse DCT process.

With the above-described construction, the decoding unit and the encoding unit can share the inverse quantization sub-unit and the inverse DCT sub-unit.

The above transcoder may further comprise a shared circuit having a selector, an adder-subtracter, a multiplier, and a cumulative adder which are connected to each other so that the multiplier multiplies values output from the selector and the adder-subtracter, and either a value output from the multiplier or a value output from the adder-subtracter is input into the cumulative adder, wherein the resizing unit and the encoding unit share the shared circuit, the resizing unit performs resizing by causing the selector to select a filter coefficient, causing the adder-subtracter to add up values of adjacent pixels, causing the multiplier to multiply the selected filter coefficient by an addition-result value output from the adder-subtracter, and causing the cumulative adder to cumulatively add a multiplication result output from the multiplier, and the encoding unit performs the predetermined calculation by causing the selector to select two pixels for comparison respectively from two sets of pixels respectively constituting consecutive two images, causing the adder-subtracter to perform a subtraction between the selected two pixels, and causing the cumulative adder to cumulatively add a difference value that is a result of the subtraction.

With the above-described construction, the resizing process and the motion prediction process can share a circuit.

In the above transcoder, one field of images may be displayed in each display period.

With the above-described construction, the transcoder can resize the video data to the second video data using an idle time that is generated in correspondence with the vertical blanking period in the CRT receivers every time they display a field.

In the above transcoder, the first resolution corresponds to either a size for HDTV or a size for SDTV, and the second resolution corresponds to a size for CIF, a size for QVGA, and a size for QCIF.

In the above transcoder, the resizing unit may resize the video data to the second video data after thinning out images constituting the video data.

In the above transcoder, the resizing unit may resize the video data to the second video data after thinning out images constituting the video data.

With the above-described construction, the transcoder can resize the video data to the second video data at a higher speed since the thinning of images lowers the bit rate of the video data.

In the above transcoder, the video data to be resized may conform to MPEG2 standard.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4A shows the construction of the resizing circuit;

FIG. 4B shows the construction of the motion prediction circuit; and

FIG. 4C shows the construction of the resizing/ME shared circuit 22.

DESCRIPTION OF THE PREFERRED EMBODIMENT

The following describes a transcoder in an embodiment of the present invention with reference to the attached drawings.

In the present embodiment, the transcoder is assumed to be included in a satellite broadcast receiving apparatus connected to an HDTV receiver, a DVD (Digital Versatile Disc) reproduction apparatus or the like. Such a receiving apparatus or a reproduction apparatus, on receiving an MPEG2 stream in satellite broadcasting or from a DVD, enters compressed video data (namely, an MPEG2-compressed video data) contained in the received MPEG2 stream into the transcoder. The transcoder decompresses the compressed video data, resizes the decompressed video data to conform to the display performance of the receivers, and outputs the video data to the receivers. In parallel with the above-described operation, the transcoder also transcodes the received MPEG2 stream into an MPEG4 stream (namely, an MPEG4-compressed video data) for mobile terminals such as mobile telephones. More specifically, the transcoder resizes the decompressed video data to conform to the display performance of the mobile terminals, compresses the resized video data in accordance with the MPEG4 standard, and outputs the MPEG4-compressed video data. The output MPEG4-compressed video data is recorded into a memory such as an SD card by a recording apparatus included in the receiving apparatus or the reproduction apparatus, then transferred, as contained in the memory, to a mobile terminal, or transferred to the mobile terminal via the Internet.

Figure 1:
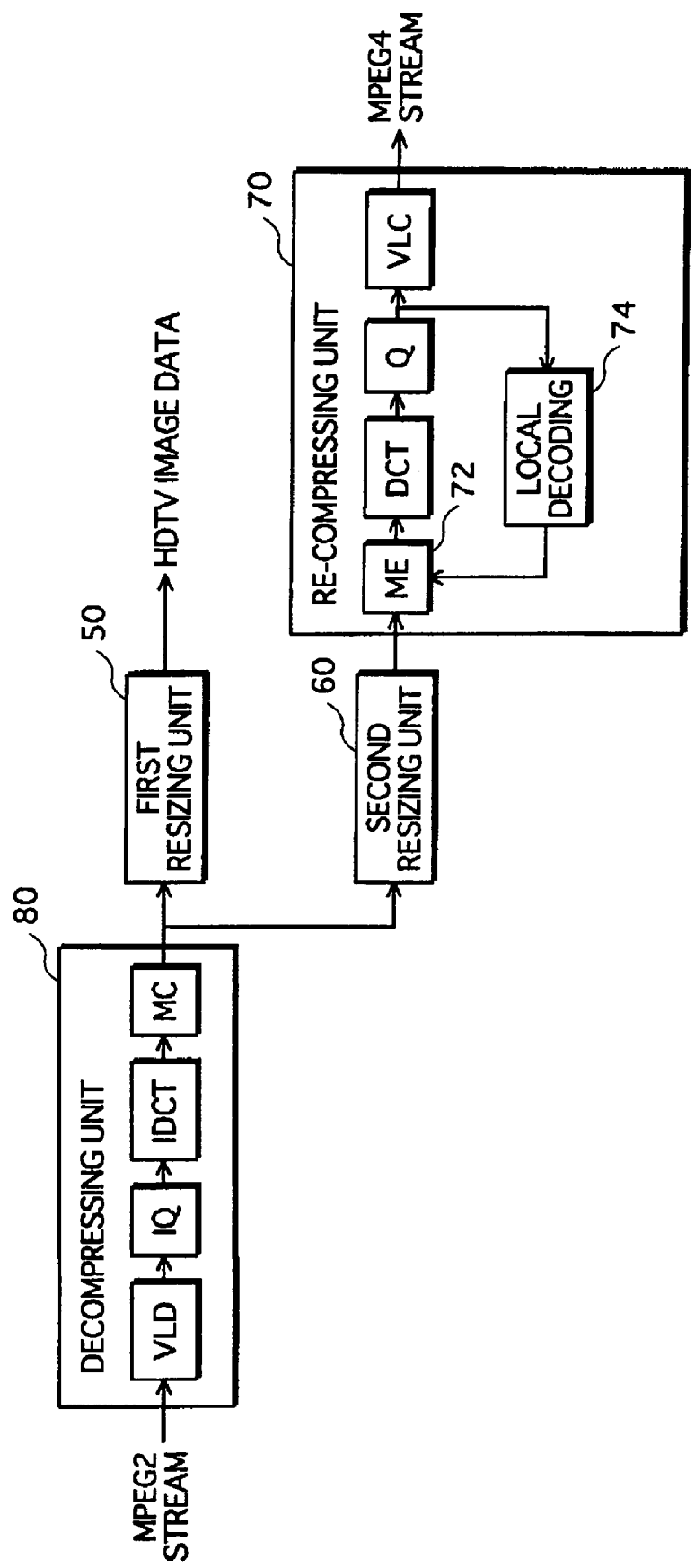
FIG. 1 shows the construction of a conventional transcoder.
Figure 2:
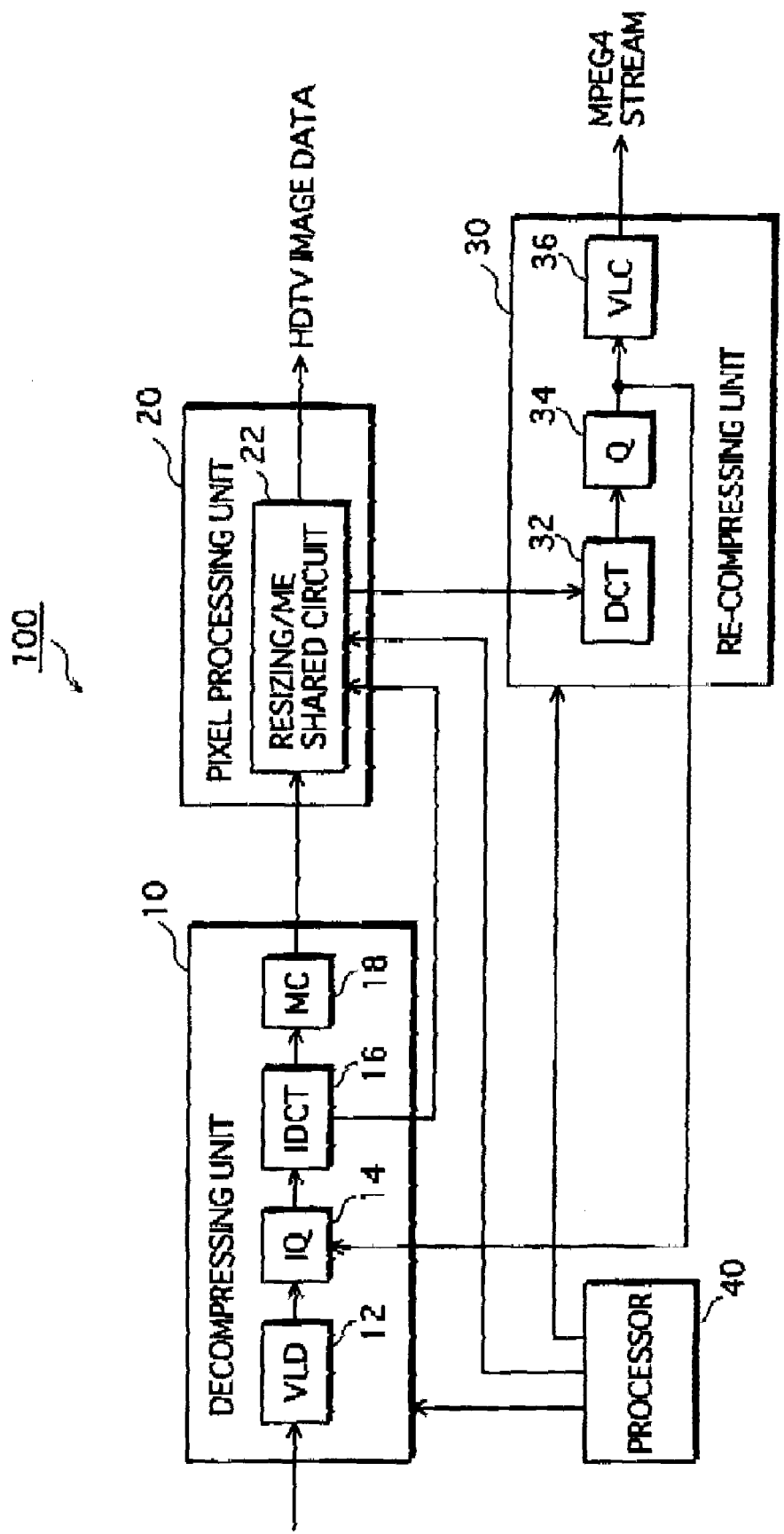
FIG. 2 shows the construction of the transcoder in the present embodiment.

FIG. 2 shows the construction of the transcoder.

As shown in FIG. 2, the transcoder 100 includes a decompressing unit 10 for decompressing the MPEG2-compressed video data, a pixel processing unit 20 for resizing mainly for receivers and mobile terminals, a re-compressing unit 30 for compressing video data to MPEG4-compressed video data, and a processor 40 for controlling the components.

The decompressing unit 10 includes a VLD unit 12, an IQ unit 14, an IDCT unit 16, and an MC unit 18, where the VLD stands for Variable Length code Decoding, IQ stands for Inverse Quantization, IDCT stands for Inverse Discrete Cosine Transform, and MC stands for Motion Compensation. The decompressing unit 10, under control of the processor 40, decodes the MPEG2-compressed video data received from outside, and outputs the decoded video data.

The VLD unit 12 performs a variable-length decoding on the received compressed video data. The decoded data contains various types of control information and macro block data. The VLD unit 12 outputs the control information to the processor 40, and outputs the macro block data to the IQ unit 14. On receiving the control information, the processor 40 analyzes the control information and according to the results thereof, controls the components of the decompressing unit 10.

The IQ unit 14 performs inverse quantization on the macro block data, and outputs the result to the IDCT unit 16.

The IDCT unit 16 performs an inverse discrete cosine transform on the data output from the IQ unit 14, and outputs the result to the MC unit 18.

The MC unit 18 performs a motion compensation on the data output from the IDCT unit 16, and outputs the result to the pixel processing unit 20.

The variable-length decoding, inverse quantization, inverse discrete cosine transform, and motion compensation are known technologies, and description on these technologies is omitted here.

The pixel processing unit 20, under control of the processor 40, resizes the video data output from the decompressing unit 10, to a resolution specified by the processor 40.

The resolutions specified by the processor 40 falls into two types: resolutions for receivers; and resolutions for mobile terminals. The resolutions for receivers are either received by the transcoder 100 from the receivers or stored in the transcoder 100 in advance. A resolution for receivers is, for example: a resolution of 1,920 pixels×1,080 lines and 30 frames/second for HDTV; or a resolution of 720 pixels× 480 lines and 30 frames/second for SDTV. The resolutions for mobile terminals are either received by the transcoder 100 from the mobile terminals or stored in the transcoder 100 in advance. A resolution for mobile terminals is, for example: a resolution of 360 pixels×240 lines and 10 frames/second as a CIF size; a resolution of 320 pixels×240 lines as a QVGA size; or a resolution of 176 pixels×144 lines as a QCIF size.

Also, the pixel processing unit 20, under control of the processor 40, performs, in units of macro blocks, a motion prediction on the video data having been resized for mobile terminals.

The pixel processing unit 20 includes a resizing/ME shared circuit 22, and uses the resizing/ME shared circuit 22 for the resizing process and the motion prediction process by the time sharing. The resizing/ME shared circuit 22 will be described in detail later with reference to FIGS. 4A–4C.

The re-compressing unit 30 compresses, in accordance with the MPEG4 standard, the video data having been subject to the motion prediction process, and outputs MPEG4-compressed video data.

The re-compressing unit 30 includes a DCT unit 32, a Q unit 34, and a VLC unit 36, where the DCT stands for Discrete Cosine Transform, Q stands for Quantization, and VLC stands for Variable Length Coding.

The DCT unit 32 performs a discrete cosine transform on the macro block data output from the pixel processing unit 20 after having been subject to the motion prediction process, and outputs the result to the Q unit 34.

The Q unit 34 performs quantization on the macro block data having been subject to the discrete cosine transform, and outputs the result to the VLC unit 36.

The VLC unit 36 performs a variable-length coding on the quantized macro block data, and outputs the result, namely an MPEG4-compressed video data.

The re-compressing unit 30 may be realized by a microcomputer that executes the above-described processes of the components.

Figure 3:
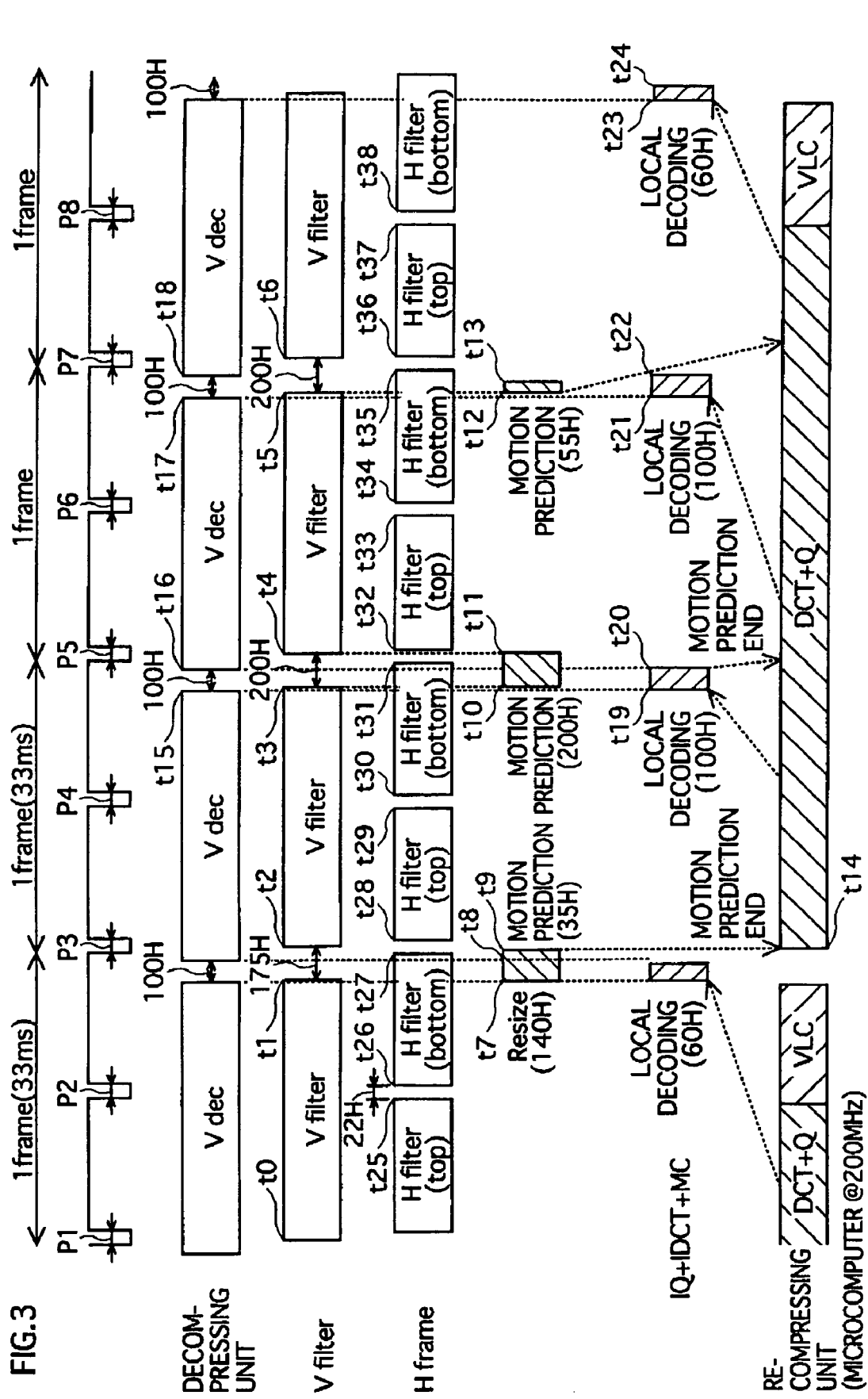
FIG. 3 shows the process execution timing of the transcoder 100.

FIG. 3 shows the process execution timing of the transcoder 100.

In FIG. 3, P1, P2, . . . P8 respectively represent vertical blanking periods, each of which is a period between an end of scanning a screen (in the present embodiment, one screen corresponds to one field) of video signals and a start of scanning another screen of video signals by a receiver. In the present embodiment, it is assumed that the screen to be scanned is 1,920 pixels×1,080 lines in size, with the scanning being the interlaced scanning, and that the vertical blanking period is generated for each field and is expressed as 22.5H, where H represents a horizontal scanning period.

The receiver scans a field of video signals between two vertical scanning periods, and displays the field. The period during which the scanning and displaying are performed is referred to as a vertical scanning period.

The pixel processing unit 20 times the resizing for a receiver to the timing of outputting data to the receiver so that the receiver can display each field during each vertical scanning period.

The resizing process for a receiver is composed of a resizing process in the vertical direction (vertical resizing) by a vertical filter and a resizing process in the horizontal direction (horizontal resizing) by a horizontal filter. The pixel processing unit 20 first performs the vertical resizing using the vertical filter on each frame of the decoded video signals, then performs the horizontal resizing using the horizontal filter on the video signals having been subject to the vertical resizing. Each frame is composed of a top field (the first half of the frame) and a bottom field (the second half of the frame). Accordingly, the horizontal filter performs the horizontal resizing by performing resizing alternately on the top field and the bottom field.

As shown in FIG. 3, the pixel processing unit 20 times the horizontal resizing of the top and bottom fields to the vertical scanning periods. More specifically, for example, the pixel processing unit 20 performs the horizontal resizing on a top field during a period between the times t28 and t29, the period being approximately in synchronization with a vertical scanning period between P3 and P4, and performs the horizontal resizing on a bottom field during a period between the times t30 and t31, the period being approximately in synchronization with a vertical scanning period between P4 and P5.

In each period between horizontal resizing of the fields (for example, the periods t25–t26, t27–t28, and t29–t30), that is to say, in each period of approximately 22 H–23 H, no horizontal resizing for receivers is performed.

The pixel processing unit 20 performs the vertical resizing with a timing slightly earlier than that with which horizontal resizing is performed so that horizontal resizing of each field is performed without delay. More specifically, the pixel processing unit 20 performs the vertical resizing of a frame that corresponds to the top field between t28 and t29 and the bottom field between t30 and t31, during a period between t2 and t3 so that horizontal resizing of these fields is performed without delay. The t2 is slightly earlier than the time t28 at which horizontal resizing of the top field is started, and the t3 is slightly earlier than the time t31 at which horizontal resizing of the bottom field is ended.

In each period between vertical resizing of the frames (for example, the periods t1–t2, t3–t4, and t5–t6), no vertical resizing for receivers is performed.

If the same amount of data per unit is processed in the horizontal resizing and the vertical resizing, a period during which no vertical resizing is performed corresponds to a vertical blanking period per frame, that is to say, 45H. However, the period during which no vertical resizing is performed varies depending on the performance of the vertical filter or the amount of decoded video signals, thus not being always 45H. It can be said, however, that a period during which no vertical resizing is performed is generated for each frame in so far as the vertical resizing is appropriately performed so that the horizontal resizing is performed without delay.

The pixel processing unit 20 performs resizing and motion prediction for mobile terminals using a vertical filter during the periods in which no vertical resizing is performed for the receivers.

More specifically, the pixel processing unit 20 performs resizing for mobile terminals using a vertical filter during a period between t7 and t8 that corresponds to a period between t1 and t2. The frame targeted in the resizing for mobile terminals is the same as the frame targeted in the vertical resizing for receivers that is performed during a period between t0 and t1. That is to say, the pixel processing unit 20 performs vertical resizing for receivers during the period between t0 and t1 and performs resizing for mobile terminals during the period between t7 and t8, in terms of the same frame of video data output from the decompressing unit 10.

The resizing for mobile terminals performed during the period between t7 and t8 includes both vertical and horizontal resizing. In this period, the pixel processing unit 20 performs, for mobile terminals, vertical resizing of a frame during the first half of the period between t7 and t8, and during the second half of the period performs horizontal resizing of the frame having been subject to the vertical resizing. For both the vertical and horizontal resizing, a vertical filter is used.

The pixel processing unit 20 then performs, during a period between t8 and t9, a motion prediction on the frame of video data having been subject to the resizing during the period t7–t8. It should be noted here that the period between t7 and t8 is equal to or included in the period between t1 and t2.

The period between t8 and t9 is not enough to complete motion prediction on one frame of video data. To complete the process, the pixel processing unit 20 performs the remaining motion prediction on the frame during a period t10–t11 and a period t12–t13. As described, the pixel processing unit 20 completes the motion prediction on one frame using three separate time periods. It should be noted here that the periods t10–t11 and t12–t13 are equal to or included in the periods t3–t4 and t5–t6, respectively.

The pixel processing unit 20 performs resizing and motion prediction for each frame for mobile terminals in the above-described manner.

The decompressing unit 10 decompresses the video data at a frame rate of 30 frames/second, while the frame rate of video data for mobile terminals is 10 frames/second. As a result, the pixel processing unit 20 thins out the frames for mobile terminals, before the resizing and motion prediction processes. More specifically, two frames out of three consecutive frames are discarded, and the remaining one frame is subject to the resizing and motion prediction for mobile terminals.

After the motion prediction process, the video data is output from the pixel processing unit 20 in sequence to the re-compressing unit 30, where the video data is subject to the discrete cosine transform, quantization, and variable length coding.

More specifically, in the example shown in FIG. 3, after the motion prediction of one frame for mobile terminals during the periods t8–t9, t10–t11, and t12–t13, the video data is output to the re-compressing unit 30 to be subject to the discrete cosine transform and quantization as occasion arises during a period starting with t14.

The motion prediction performed by the pixel processing unit 20 requires reference frames. To obtain the reference frames, it is necessary to perform local decoding. In the local decoding, the frames, on which the discrete cosine transform and quantization have been performed by the re-compressing unit 30, are re-decompressed. The local decoding process includes the inverse quantization, inverse discrete cosine transform, and motion compensation.

The transcoder 100 performs the local decoding using the IQ unit 14, IDCT unit 16, and MC unit 18 in the decompressing unit 10.

The decompressing unit 10 decompresses the MPEG2-compressed video data for each frame with the timing shown in FIG. 3 so that the pixel processing unit 20 can perform the vertical resizing for each frame without delay.

The decompressing unit 10 performs the local decoding using the idle times that are generated between each decoding of frames. For example, in FIG. 3, the periods t15–t16 and t17–t18 are such idle times, which correspond to the vertical blanking periods. The decompressing unit 10 performs the local decoding, for example, during the periods t19–t20 and t21–t22 that correspond to the idle time periods t15–t16 and t17–t18, respectively.

Now, an explanation of the resizing/ME shared circuit 22 of the pixel processing unit 20 will be given.

The resizing/ME shared circuit 22 is composed of circuits including a resizing circuit and a motion prediction circuit, where the circuits are arranged so that the resizing circuit, which performs calculations for resizing, and the motion prediction circuit, which performs calculations for motion prediction, share one or more arithmetic units. FIG. 4A shows the resizing circuit. FIG. 4B shows the motion prediction circuit. FIG. 4C shows the resizing/ME shared circuit 22 being a combinations of the units shown in FIGS. 4A and 4B.

FIG. 4A shows the construction of the resizing circuit.

In FIG. 4A, the resizing circuit is composed of a selector 600, an adder 601, a multiplier 602, and cumulative adders 603 and 604. The selector 600 selects a filter coefficient to be used in multiplication, and outputs the selected filter coefficient to the multiplier 602. The adder 601 adds up values of adjacent pixels, and outputs the addition result to the multiplier 602. The multiplier 602 multiplies the filter coefficient by the addition-result value. The cumulative adders 603 and 604 add the multiplication results cumulatively to obtain a final calculation result of the resizing circuit.

FIG. 4B shows the construction of the motion prediction circuit.

In FIG. 4B, the motion prediction circuit is composed of selectors 605 and 614, a subtracter 606, and cumulative adders 607 and 608. The selector 605 selects a pixel among those constituting a reference image. The selector 614 selects a pixel among those constituting an image that is a compression target. The subtracter 606 calculates a difference between the pixels selected by the selectors 605 and 614. The cumulative adders 607 and 608 add the difference values cumulatively.

FIG. 4C shows the construction of the resizing/ME shared circuit 22 being a combination of FIGS. 4A and 4B.

In FIG. 4C, the resizing/ME shared circuit 22 is composed of selectors 609 and selector 615, an adder-subtracter 610, cumulative adders 611 and 612, and a multiplier 613. A selector is provided between the selector 609 and the adder-subtracter 610. Also, a selector is provided between the multiplier 613 and the cumulative adders 611 and 612.

On receiving from the processor 40 an instruction to function as the resizing circuit, the resizing/ME shared circuit 22 operates as follows.

The selector 609 selects a filter coefficient to be used in multiplication, and outputs the selected filter coefficient to the multiplier 613. The selector between the selector 609 and the adder-subtracter 610 selects an input value on the right-hand side in the drawing so that a value of one of two adjacent pixels is input into the adder-subtracter 610. The selector 615 selects the other pixel value of the adjacent pixels to be input into the adder-subtracter 610. The adder-subtracter 610, functioning as an adder, adds up the values of the adjacent pixels, and outputs the addition result to the multiplier 613. The multiplier 613 multiplies the filter coefficient by the addition-result value. The selector between the multiplier 613 and the cumulative adders 611 and 612 selects an input value on the left-hand side in the drawing so that the multiplication result value is input into the cumulative adders 611 and 612. The cumulative adders 611 and 612 add the multiplication results cumulatively to obtain a final calculation result of the resizing circuit.

Also, on receiving from the processor 40 an instruction to function as the motion prediction circuit, the resizing/ME shared circuit 22 operates as follows.

The selector 609 selects a pixel among those constituting a reference image. The selector between the selector 609 and the adder-subtracter 610 selects an input value on the left-hand side in the drawing so that the pixel selected by the selector 609 is input into the adder-subtracter 610. The selector 615 selects a pixel among those constituting an image that is a compression target. The adder-subtracter 610, functioning as a subtracter, calculates a difference between the pixels input from the selectors, that is, pixels respectively of the reference image and the compression target image. The selector between the multiplier 613 and the cumulative adders 611 and 612 selects an input value on the right-hand side in the drawing so that the difference value is input into the cumulative adders 611 and 612. The cumulative adders 611 and 612 add the difference values cumulatively.

As described above, the transcoder 100: (1) performs the resizing for receivers and mobile terminals by the time sharing causing the two resizing processes to share the pixel processing unit 20; (2) performs the resizing and motion prediction processes for mobile terminals causing the two processes to share a circuit in the pixel processing unit 20; and (3) performs the decompressing of the MPEG2 compressed video data and the local decoding necessary for the motion prediction for mobile terminals, by the time sharing causing the two processes to share the IQ unit 14, IDCT unit 16, and MC unit 18.

The present invention provides an effect that the construction of the resizing circuit can be simplified by adopting either all or part of the above-described arrangements (1) to (3).

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A transcoder for resizing video data and outputting the resized video data to a reproduction apparatus, the reproduction apparatus reproducing the resized video data by repeating a display period and a non-display period alternately, the transcoder comprising:
   a resizing unit operable to resize the video data; and
   a control unit operable to cause the resizing unit to resize the video data to first video data having a first resolution so that the reproduction apparatus displays one image during each display period, and
   cause the resizing unit to resize, during each period between the resizing of the video data to the first video data, the video data to second video data having a second resolution that is lower than the first resolution.

2. The transcoder of claim 1 further comprising:
   a receiving unit operable to receive encoded video data from outside the transcoder;
   a decoding unit operable to decode the received encoded video data to obtain the video data to be resized by the resizing unit to the first video data; and
   an encoding unit operable to encode video data, wherein the control unit causes the encoding unit to encode the second video data.

3. The transcoder of claim 2, wherein
   the encoding unit causes the decoding unit to perform, during each period between the decoding by the decoding unit for the video data to be resized to the first video data, a local decoding on second encoded video data that is obtained by encoding the video data obtained by the decoding unit, and
   the encoding unit performs a predetermined calculation using a result of the local decoding to obtain a prediction error, during each period between the resizing of the video data to the first video data, and encodes video data based on the calculated prediction error.

4. The transcoder of claim 3, wherein
   the encoded video data received by the receiving unit has been subject to a DCT process and a quantization process, and
   the decoding unit includes:
   an inverse quantization sub-unit operable to perform an inverse quantization process corresponding to the quantization process, on the received video data; and
   an inverse DCT sub-unit operable to perform an inverse DCT process corresponding to the DCT process, on the received video data, wherein
   the decoding performed by the decoding unit caused either by the control unit or the encoding unit includes the inverse quantization process and the inverse DCT process.

5. The transcoder of claim 3 further comprising
   a shared circuit having a selector, an adder-subtracter, a multiplier, and a cumulative adder which are connected to each other so that the multiplier multiplies values output from the selector and the adder-subtracter, and either a value output from the multiplier or a value output from the adder-subtracter is input into the cumulative adder, wherein
   the resizing unit and the encoding unit share the shared circuit,
   the resizing unit performs resizing by causing the selector to select a filter coefficient, causing the adder-subtracter to add up values of adjacent pixels, causing the multiplier to multiply the selected filter coefficient by an addition-result value output from the adder-subtracter, and causing the cumulative adder to cumulatively add a multiplication result output from the multiplier, and
   the encoding unit performs the predetermined calculation by causing the selector to select two pixels for comparison respectively from two sets of pixels respectively constituting consecutive two images, causing the adder-subtracter to perform a subtraction between the selected two pixels, and causing the cumulative adder to cumulatively add a difference value that is a result of the subtraction.

6. The transcoder of claim 1, wherein
   in each display period, one field of images is displayed.

7. The transcoder of claim 1, wherein
   the first resolution corresponds to either a size for HDTV or a size for SDTV, and
   the second resolution corresponds to a size for CIF, a size for QVGA, and a size for QCIF.

8. The transcoder of claim 1, wherein
   the resizing unit resizes the video data to the second video data after thinning out images constituting the video data.

9. The transcoder of claim 1, wherein
   the video data to be resized conforms to MPEG2 standard.

* * * * *